United States Patent
Burch et al.

(10) Patent No.: US 10,311,548 B2
(45) Date of Patent: Jun. 4, 2019

(54) SCALING RENDER TARGETS TO A HIGHER RENDERING RESOLUTION TO DISPLAY HIGHER QUALITY VIDEO FRAMES

(71) Applicant: Microsoft Technology Licensing, LLC, Redmond, WA (US)

(72) Inventors: Warren Lee Burch, Redmond, WA (US); Eric David Heutchy, Carnation, WA (US); Chen Li, Sammamish, WA (US); Matthew Gordon, Redmond, WA (US); Aaron Blake Stover, Sammamish, WA (US); Roger John Perkins, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 15/695,871

(22) Filed: Sep. 5, 2017

(65) Prior Publication Data

US 2019/0073747 A1 Mar. 7, 2019

(51) Int. Cl.
*G06T 3/40* (2006.01)
*G06T 15/00* (2011.01)
(Continued)

(52) U.S. Cl.
CPC .......... *G06T 3/4092* (2013.01); *G06T 3/0012* (2013.01); *G06T 15/005* (2013.01);
(Continued)

(58) Field of Classification Search
None
See application file for complete search history.

(56) References Cited

U.S. PATENT DOCUMENTS 6,577,311 B1  6/2003  Crosby et al.
6,870,547 B1  3/2005  Crosby et al.
(Continued)

FOREIGN PATENT DOCUMENTS

EP    2081150 A1    7/2009

OTHER PUBLICATIONS

Gordon, Whitson, "Run PC Games at a Higher Resolution Than Your Monitor Supports", http://lifehacker.com/run-pc-games-at-a-higher-resolution-than-your-monitor-s-1577524203, Published on: May 16, 2014, 4 pages.

*Primary Examiner* — Peter Hoang
(74) *Attorney, Agent, or Firm* — Newport IP, LLC; Jacob P. Rohwer

(57) ABSTRACT

Examples described herein improve the quality of the video frames that are rendered and displayed. A system is configured to generate render targets based on instructions received from a source of video content. The system is configured to create and/or access a selection parameter and use the selection parameter to identify one or more of the render targets to be scaled. Once identified, the system scales a native size (e.g., a native resolution) of an identified render target to a larger size (e.g., based on a predetermined scaling factor), thereby generating a higher density render target. The higher density render target, or a corresponding higher density render target texture (RTT), can be used in a rendering pipeline to produce a video frame in a higher output resolution (e.g., 4k resolution) compared to the output resolution specified in the instructions (e.g., 720p resolution).

20 Claims, 8 Drawing Sheets

(51) Int. Cl.
*G06T 3/00* (2006.01)
*G06T 15/04* (2011.01)
*G06T 13/20* (2011.01)
*G06T 19/20* (2011.01)

(52) U.S. Cl.
CPC .............. *G06T 15/04* (2013.01); *G06T 13/20* (2013.01); *G06T 19/20* (2013.01); *G06T 2219/2016* (2013.01)

(56) References Cited

U.S. PATENT DOCUMENTS

| | | |
|---|---|---|
| 7,298,928 B2 | 11/2007 | Huang et al. |
| 8,441,474 B2 | 5/2013 | Nedeljkovic et al. |
| 8,605,133 B2 | 12/2013 | Lampotang et al. |
| 8,665,266 B2 * | 3/2014 | Vandrovec ............ G06T 17/005 345/420 |
| 8,884,949 B1 | 11/2014 | Lambert et al. |
| 9,547,889 B2 | 1/2017 | Goshen |
| 9,607,428 B2 | 3/2017 | Li |
| 2003/0112347 A1 * | 6/2003 | Wyman ................. H04N 5/772 348/231.99 |
| 2003/0128210 A1 | 7/2003 | Muffler et al. |
| 2004/0027593 A1 | 2/2004 | Wilkins |
| 2006/0023065 A1 | 2/2006 | Alden |
| 2009/0265661 A1 | 10/2009 | Shuster |
| 2015/0154778 A1 | 6/2015 | Hughes |
| 2015/0177822 A1 * | 6/2015 | Shoshan ............... G06F 1/3293 345/522 |
| 2017/0045941 A1 | 2/2017 | Tokubo et al. |
| 2017/0109935 A1 | 4/2017 | Loffler |

* cited by examiner

SCALING RENDER TARGETS TO A HIGHER RENDERING RESOLUTION TO DISPLAY HIGHER QUALITY VIDEO FRAMES

BACKGROUND

Video rendering typically uses a rendering pipeline to display a video frame. A sequence of video frames displayed via a display device can comprise a scene of video content. The rendering pipeline often includes multiple render targets, which are individually generated based on instructions provided by a source of the video content. The instructions provided by the source of the video content cause a system to render and display video frames in an output resolution, which can be associated with capabilities of a typical display screen. That is, the source of the video content can comprise code that is written to support the display of the video frames in the output resolution.

SUMMARY

This disclosure describes techniques that improve the quality of the video frames that are rendered and displayed. The quality of the video frames is improved because the video frames are rendered and displayed in an output resolution that is greater than an original output resolution in which the video frames were intended to be rendered and displayed. For example, a source of video content may initially provide instructions to render and display video content on a display screen in a first output resolution (e.g., a 1280×720 resolution, which may also be referred to as 720p resolution). The first output resolution may alternatively be referred to herein as an "original" output resolution or a "lower" output resolution. However, the system or device configured to display the video content may be capable of displaying video frames in a second output resolution that is greater than the first output resolution. The second output resolution may alternatively be referred to herein as a "higher" output resolution (e.g., one with an increased pixel count compared to the first output resolution). For instance, the second output resolution may comprise a 3840×2160 resolution, which may also be referred to as 4 k resolution. In order to display video frames in the second output resolution, the system described herein is configured to scale individual render targets of a rendering pipeline from a first render target resolution that is native to an individual render target to a second render target resolution that is greater than the first render target resolution. Consequently, the displayed video content is of a higher quality due to an increase in pixel count associated with the second output resolution. As examples, the increase in pixel count can (i) reduce edge aliasing in a scene, (ii) add detail to distant geometry of the scene, and (iii) form more detailed texture Multum In Parvo (MIP) levels.

A source of the video content can comprise code that is written to display video content (e.g., three-dimensional (3D) images). In one example, the code can be accessed via memory. For instance, the code can be embedded on a disc or other media item that is inserted into a system or that is part of a system (e.g., a console, a computing device, etc.). In another example, the code can be received from a media providing service over a network. In these examples, the system is configured to read and/or receive the code and execute the code.

The code includes instructions to generate render targets. For each render target to be generated, the code can include rendering parameters. In one example, a rendering parameter for an individual render target includes a render target resolution. The render target resolution represents a native size of the render target (e.g., a width dimension and a height dimension in pixels). The system described herein is configured to scale an individual render target, generated based on instructions received from a source of video content, from its native size to a larger size so that a higher output resolution for video frames can be achieved. As described above, the higher output resolution is likely not natively supported by the code. That is, the instructions provided by the source of the video content are directed to rendering the video content in a lower output resolution, not the higher output resolution.

As described above, the render targets are generated (e.g., drawn, created, etc.) by the system based on instructions read and/or received from the source of video content. In various examples, the instructions can be part of a command stream. The render targets are useable, for example, in a rendering pipeline to display video frames in a first output resolution. The render targets generated can be associated with render target textures and/or buffers that include data to be accessed and executed by a graphics processing unit (GPU) (e.g., a graphics card) via a rendering pipeline so that the video frames can be displayed. The rendering pipeline can describe steps a graphics system performs to render a three-dimensional (3D) scene on a two-dimensional (2D) display screen. For instance, upon creation of a 3D model of the scene in a video animation (e.g., a video game, an animated movie, an animated television program, etc.), the render targets of the rendering pipeline transform the 3D model into the video frames to be displayed. Graphics modules, such as application programming interfaces (APIs), are configured to manage the rendering pipeline for underlying hardware, such as GPUs and/or accelerators. Consequently, the source of the video content does not need to include complex programmable code useable to manipulate the underlying hardware in order to display the video content.

Different render targets that are part of the rendering pipeline can include information related to: a depth of pixels in a scene, a color (e.g., RGB format) of pixels in the scene, a reflection of pixels in the scene, a lighting of pixels in the scene, a shading or a shadow of pixels in the scene, a down-sampled version of the scene (e.g., used for post-processing effects such as blurring an object that is moving fast through the scene), a user interface (UI) element for the scene (e.g., used to display an overlay image such as game statistics—speed, number of kills, etc.), and/or other information useable in a rendering pipeline to produce video frames to be output. The render targets can be combined to generate a final video frame to be displayed as part of a scene in the video content. That is, an output of one render target (e.g., an intermediate render target in the rendering pipeline), or a corresponding render target texture (RTT), can be used as an input to another render target.

As described, the instructions provided to generate an individual render target can specify rendering parameters for the individual render target. A rendering parameter can be associated with a characteristic of the render target, such as a type of information in the render target. In one example, a rendering parameter includes a native size of the render target, in pixels (e.g., a 1280×720 resolution, a 640×360 resolution, a 360×360 resolution, etc.). A native size of an individual render target in the rendering pipeline may not correspond to the final output resolution (e.g., screen resolution) of a video frame to be displayed on a display device. In fact, multiple render targets that are part of a rendering pipeline configured to produce a video frame in a final output resolution (e.g., a 1280×720 resolution), often have varying native sizes (e.g., a 1280×720 resolution, a 640×360 resolution, a 360×360 resolution, etc.). Other example rendering parameters, which can vary from one render target to the next in the rendering pipeline, can include types of shaders used and/or different graphics settings used (e.g., a blending setting, depth and stencil mode, scissor/viewport/guard band, a number and/or format of multiple simultaneous render targets, etc.).

After generating the render targets based on the instructions received from the source of the video content (e.g., these may be referred to herein as "original" render targets), the system can determine that the video content is capable of being displayed in a second output resolution that is greater than the first output resolution that is supported by instructions. Based on this determination, the system is configured to create and/or access one or more selection parameters associated with the second output resolution. The system uses the selection parameters to identify one or more of the render targets to scale from a native size to a larger size so that a higher output resolution can be achieved. That is, the system analyzes each of the render targets in a rendering pipeline and determines which ones have rendering parameters that satisfy (e.g., match) the selection parameters. The system then scales an identified render target from a native size to a larger size, thereby generating a "higher density" render target. In various examples, the scaling increases the native size of a render target by a predetermined scaling factor (e.g., 1.5, 2, 3, 5, 6). For instance, if a dimension of a native size comprises 1280 pixels and the predetermined scaling factor is three, then the larger size that results from scaling comprises 3840 pixels. The predetermined scaling factor can be established based on the first output resolution supported by the instructions received from the source of the video content and/or the second output resolution associated with a display device (e.g., a display screen).

In various examples, only a subset of the render targets that are part of a rendering pipeline are identified for scaling. For instance, dozens of render targets may typically be used to display a video frame of a scene. However, scaling every one of the render targets in the rendering pipeline may not provide a benefit that is worth the cost to scale every one of the render targets in the rendering pipeline. For instance, a change in the graphical quality of a displayed scene may be limited or may not be noticeable if a higher density render target is used instead of an original render target. Accordingly, the system described herein can use the selection parameters to identify a subset of the render targets in the rendering pipeline so that not all the render targets in the rendering pipeline are scaled. This helps conserve processing and memory resources because not every render target in a rendering pipeline needs to be scaled to a higher render target resolution and not every render target has a corresponding higher density render target that needs to have memory allocated for storage purposes. Furthermore, any delay that might result from the rendering and displaying processes can be reduced if not every render target in the rendering pipeline is scaled.

In some examples, the system is configured to use the selection parameters to identify the more important render targets in the rendering pipeline for scaling. The more important render targets comprise render targets that have or are likely to have a greater effect on the graphical quality of a video frame that is to be displayed. Accordingly, render targets that have or are likely to have a lesser effect on the graphical quality of the video frame are not scaled, yet are still used in the rendering pipeline to produce the final video frame to be displayed. Alternatively, in some implementations, all of the render targets in the rendering pipeline can be scaled.

Upon generating the original render targets based on the instructions received from the source of the video content, the system stores the original render targets in a first region of memory. After the identified render targets are scaled, the system stores the corresponding higher density render targets in a second region of the memory. In various examples, the first region of memory is allocated to the source of the video content (e.g., a game title), and thus, the source of the video content is aware of data that is stored in the first region of memory. For instance, code of a game title can access, via a call, an original render target that has already been generated so that it can be used in a rendering pipeline to generate a final video frame of a new or previous scene. However, the second region of memory is private system memory that is allocated for displaying the video content, and thus, the source of the video content is unaware of a higher density render target that is stored in the second region of the memory. Consequently, the source of the video content does not know that higher density render targets are used to render and display video frames.

The system is configured to create a pointer (e.g., a mapping) that redirects an access to an original render target stored in the first region of the memory to a corresponding higher density render target stored in the second region of the memory. The pointer can be used in a resolve operation so that the higher density render target, or a corresponding higher density render target texture (RTT), is provided to a command buffer associated with a rendering pipeline, and the higher density rendering target or the corresponding higher density RTT can be subsequently used by a graphics processing unit to display a final video frame on a display device in the second output resolution. Both original and higher density render targets, as well as original and higher density RTTs, can be used in the rendering pipeline to produce the final video frame to be displayed in the second output resolution as part of a scene.

In various examples, the selection parameter used to identify render targets for scaling can define one or more native sizes (e.g., native render target resolutions). For example, the selection parameter can include a whitelist of native sizes that are approved for scaling. The whitelist can contain exact native sizes (e.g., a 1280×720 resolution, a 640×360 resolution, etc.) and/or variable native sizes in which one dimension is defined but the other can vary (e.g., a 1280×* resolution, a *×720 resolution, etc.). In additional or alternative examples, the selection parameter can include a blacklist of native sizes that are prohibited from being scaled. The blacklist can contain exact native sizes and/or variable native sizes, as well.

Since a higher density render target has its native size scaled to a larger size (e.g., based on a predetermined scaling factor), additional information may also need to be scaled. For example, a coordinate location of a pixel in an original render target may need to be adjusted to a new coordinate location in the higher density render target to maintain correspondence of the pixel across the render targets. Accordingly, in various examples, the system creates a mapping of the coordinate location of the pixel in the original render target to the new coordinate location of a corresponding pixel in the corresponding higher density render target. The system can store the mapping in association with the original render target and/or the corresponding higher density render target. The mapping can be used, for example, to modify a viewport, a scissor rectangle, and/or other screen space constructs.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein improve the quality of the video frames that are rendered and displayed. A system is configured to generate render targets based on instructions received from a source of video content. The system is also configured to determine that the video content is capable of being displayed in an output resolution that is greater than an output resolution specified in the instructions. Based on this determination, the system is configured to create and/or access a selection parameter and use the selection parameter to identify one or more of the render targets to be scaled. Once identified, the system scales a native size (e.g., a native resolution) of an identified render target to a larger size (e.g., based on a predetermined scaling factor), thereby generating a higher density render target. The higher density render target, or a corresponding higher density render target texture (RTT), can be used in a rendering pipeline to produce a video frame in a higher output resolution (e.g., 4 k resolution) compared to the output resolution specified in the instructions (e.g., 720p resolution).

In various examples, only a subset of the render targets that are part of a rendering pipeline are identified for scaling. A rendering pipeline may include dozens of render targets. Scaling every one of the render targets in the rendering pipeline may not provide a benefit that is worth the resource consumption cost to scale every one of the render targets in the rendering pipeline. Accordingly, the system described herein can use the selection parameters to identify a subset of the render targets in the rendering pipeline so that not all the render targets in the rendering pipeline are scaled. This helps conserve processing and memory resources because not every render target in a rendering pipeline needs to be scaled to a higher rendering resolution and not every render target has a corresponding higher density render target that needs to have memory allocated for storage purposes. Furthermore, any delay that might result from the rendering and displaying processes can be reduced if not every render target in the rendering pipeline is scaled.

Various examples, scenarios, and aspects that relate to the scaling of render targets are described below with reference to FIGS. 1-8.

Figure 1:
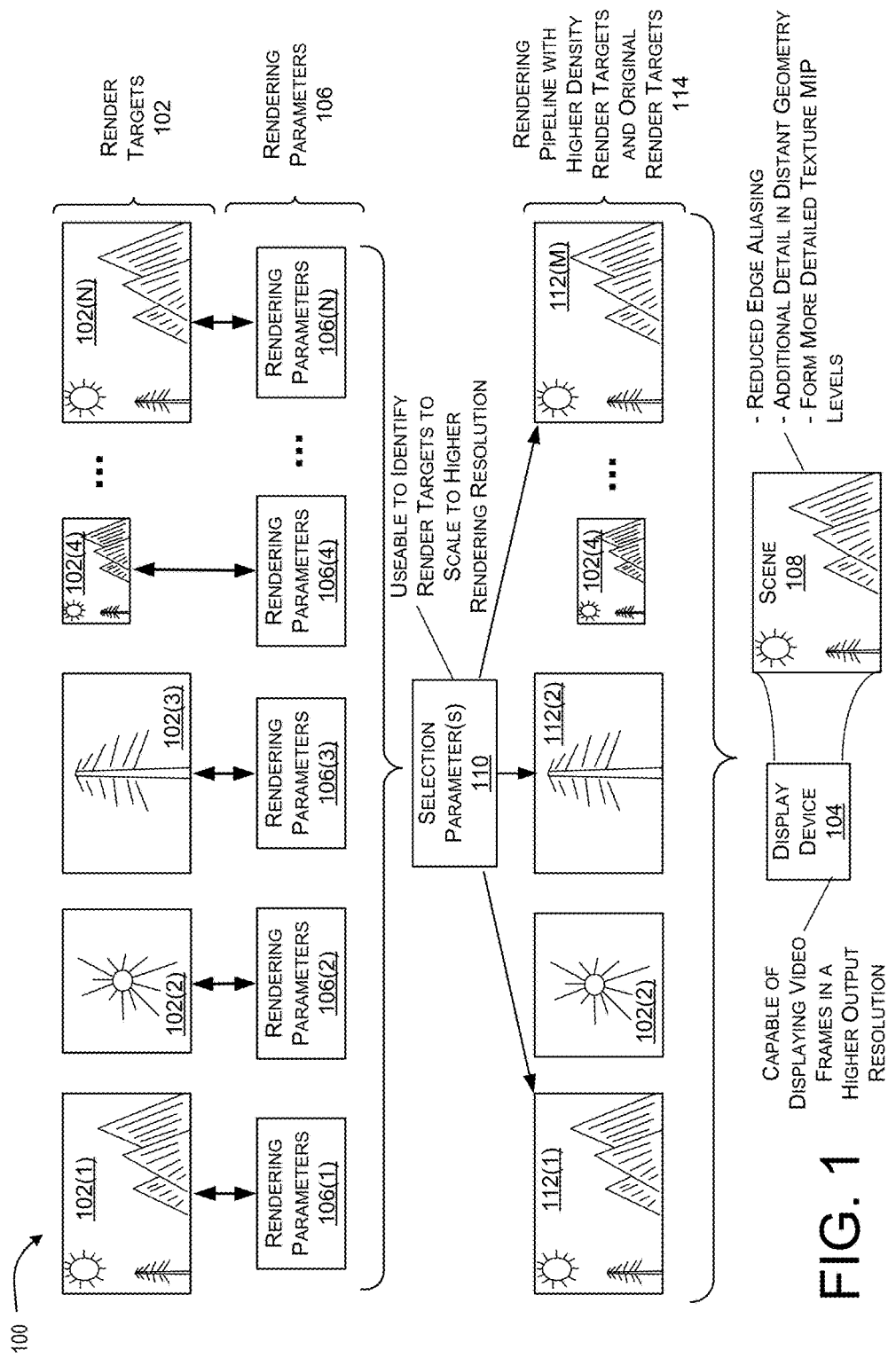
FIG. 1 is a diagram illustrating how render targets that are part of a rendering pipeline can be identified for scaling, in order to improve the quality of video frames displayed on a display device.

FIG. 1 is a diagram 100 illustrating how render targets 102 that are part of a rendering pipeline can be identified for scaling by a system tasked with rendering and/or displaying video content, in order to improve the quality of video frames displayed on a display device 104. The render targets 102 are generated (e.g., drawn, created, etc.) based on instructions received from a source of video content. In one example, the source of the video content is a game title. The game title can include code executable to generate and display game content (e.g., video frames). The code can be accessed by the system via memory (e.g., a disc that is inserted into a game console) and/or received by the system over a network. In other examples, the source of the video content can be a media service provider or a media program that enables a system to access code that renders video content (e.g., an animated movie).

The instructions provided cause the system to generate the render targets 102, which can be used to display video frames in a first output resolution (e.g., an original output resolution). However, in some instances, the display device 104 may be capable of displaying the video frames in a second output resolution that is greater than the first output resolution. In one example, initially received instructions may support rendering and displaying the video frames in a 1280×720 output resolution (e.g., 720p resolution), while the display device 104 is capable of rendering and displaying the video frames in a 3840×2160 output resolution (e.g., 4 k resolution) or a down-sampled version. Consequently, the system described herein scales individual render targets in a rendering pipeline to a higher rendering resolution so that a video frame produced via the rendering pipeline can be displayed at the higher output resolution.

In this example, the group of render targets include a first render target 102(1), a second render target 102(2), a third render target 102(3), a fourth render target 102(4), and a Nth render target 102(N) (where N is a positive integer number and can include, for example, up to twenty-five and perhaps even more). A render target includes information useable to produce a final video frame to be displayed as part of a scene. Moreover, render targets and/or their corresponding render target textures (RTTs) can be combined within a rendering pipeline to produce the final video frame to be displayed as part of the scene.

In the example of FIG. 1, render target 102(1) may include a color map of objects in a scene (e.g., a sun object, a tree object, and mountain objects), render target 102(2) may include a shadow buffer that is useable to draw tree shadows in the scene from a first angle (e.g., a top-down view of the tree object is illustrated), render target 102(3) may include another shadow buffer that is useable to draw tree shadows in the scene from a second angle (e.g., a side view of the tree object is illustrated), render target 102(4) may include a down-sampled version of the scene (e.g., which can be used for post-processing effects), and render target 102(N) may include a depth map of the objects in the scene. The render targets 102 illustrated are provided for ease of discussion, and thus, it is understood that more or less render targets may be used in the rendering pipeline to display a video frame of a scene in a video game or a movie, for example.

Each of the render targets 102 includes rendering parameters 106. Thus, render target 102(1) has corresponding rendering parameters 106(1), render target 102(2) has corresponding rendering parameters 106(2), render target 102(3) has corresponding rendering parameters 106(3), render target 102(4) has corresponding rendering parameters 106(4), and render target 102(N) has corresponding rendering parameters 106(N). A rendering parameter can be associated with a characteristic of a render target, such as a type of information in the render target. Thus, the rendering parameters can vary from one render target to the next in a rendering pipeline that is used to produce a final video frame that is part of a scene 108 displayed on the display device 104.

In one example, a rendering parameter includes a native size of a render target. For instance, render targets 102(1), 102(3), and 102(N) may have a native size of 1280×720 pixels, while render target 102(2) has a native size of 720×720 pixels, and render target 102(4) has a native size 640×360 pixels. Some render targets in the rendering pipeline may have a native size that corresponds to an output resolution in which a video frame is to be displayed, while others may not. Other example rendering parameters 106 can include types of shaders used and/or different graphics settings used (e.g., a blending setting, depth and stencil mode, scissor/viewport/guard band, a number and/or format of multiple simultaneous render targets, etc.).

FIG. 1 further illustrates selection parameter(s) 110. The selection parameters 110 can be established and/or used by the system to identify render targets to scale to a higher rendering resolution. In various examples, a render target is identified for scaling if it has render parameters that satisfy (e.g., match) the selection parameters 110. For ease of discussion, the selection parameters 110 in FIG. 1 may define that render targets of a particular native size (e.g., a 1280×720 resolution) are approved for scaling. However, different selection parameters can also or alternatively be used to identify render targets for scaling. Based on the particular native size as a selection parameter 110, the system scales render target 102(1) from a lower render target resolution to a higher render target resolution (e.g., a 3840×2160 resolution) thereby creating a higher density render target 112(1) that corresponds to original render target 102(1). The system scales render target 102(3) from the lower render target resolution to the higher render target resolution (e.g., a 3840×2160 resolution) thereby creating a higher density render target 112(2) that corresponds to original render target 102(3). And the system converts render target 102(N) from the lower render target resolution to the higher render target resolution (e.g., a 3840×2160 resolution) thereby creating a higher density render target 112(M) that corresponds to original render target 102(N) (where M is an integer number that is less than or equal to N).

As described above, in some examples, not all of the render targets that are part of a rendering pipeline are scaled. Rather, the system may identify a subset of the render targets to scale. The subset can include the more important render targets. The more important render targets comprise render targets that have a greater effect on the graphical quality of a final video frame that is displayed. Additionally or alternatively, the subset can exclude render targets that, if scaled, can cause correctness issues. Accordingly, render targets that have a lesser or a negative effect on the graphical quality of the final video frame are not scaled. FIG. 1 illustrates a rendering pipeline 114 that is used to produce a final video frame in the higher output resolution (e.g., a 3840×2160 resolution). The rendering pipeline 114 includes higher density render target 112(1), original render target 102(2) since it did not have a rendering parameter that matched the selection parameters 110, higher density render target 112(2), original render target 102(4) since it did not have a rendering parameter that matched the selection parameters 110, and higher density render target 112(M).

By identifying some but not all of the render targets in the rendering pipeline for scaling, the system is able to save processing and memory resources because not every render target in the rendering pipeline needs to be scaled to a higher rendering resolution and not every render target has a corresponding higher density render target that needs memory allocated for storage purposes.

The rendering pipeline 114 is configured to produce a final video frame to be displayed on the display device 104 as part of the scene 108. The final video frame is displayed in the higher output resolution with more rendered pixels compared to that of the lower output resolution in which the received instructions intended the video frame to be displayed. This improves the graphical quality of the scene by reducing edge aliasing, providing additional detail in distant geometry, forming more detailed texture MIP levels, etc.

In some implementations, the scaling techniques described herein can still be implemented even without a display device that is capable of displaying video frames at a higher output resolution. For instance, render targets can be identified and scaled to increase the pixel count used in rendering and to expand on the amount of detail used in rendering. A final video frame can be produced using a rendering pipeline with higher density render targets or corresponding higher density RTTs. The final video frame can then be down-sampled, prior to display, so that it can be output at the lower output resolution. Since the down-sampling is performed on a final video frame with an increased pixel count, the quality of the output, even at the lower resolution, is improved.

Figure 2:
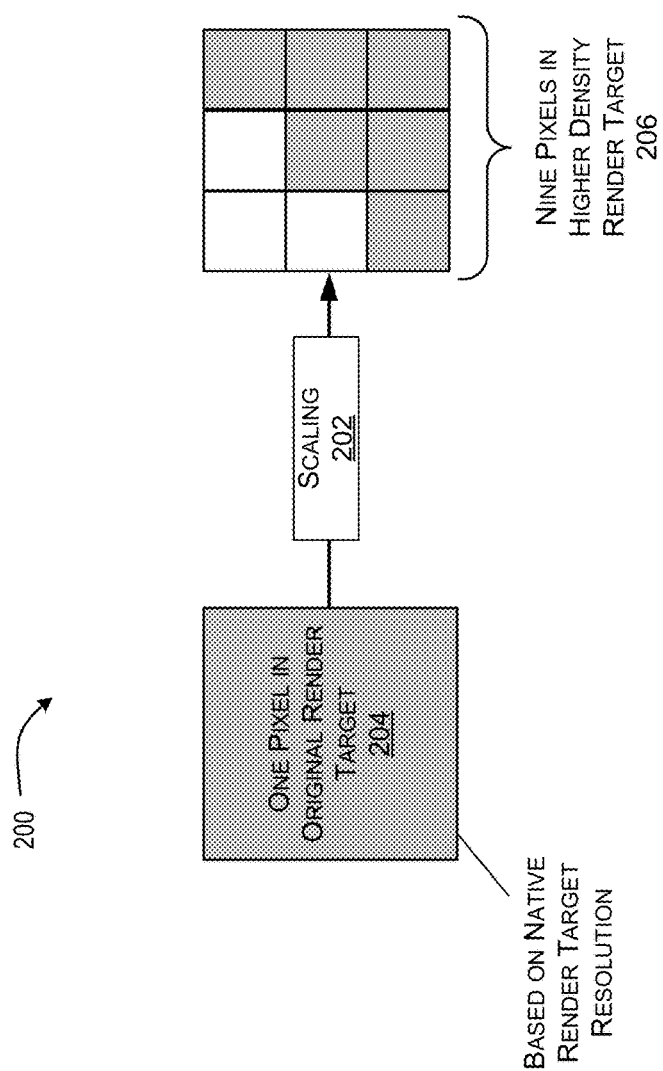
FIG. 2 is a diagram illustrating how a number of pixels in a render target is increased as a result of the scaling.

FIG. 2 is a diagram 200 illustrating how a number of pixels in a render target is increased due to scaling 202. As shown, one pixel in an original render target 204, which is generated in accordance with a render target resolution that is native to and supported by the code of a media source (e.g., a game title), may be scaled by a predetermined scaling factor (e.g., three in this example—each dimension is scaled by three). Consequently, the one pixel is converted and/or transformed into nine pixels in a higher density render target 206, thereby increasing the pixel count of a render target used in a rendering pipeline. As shown, the capacity to display more graphical detail is increased (e.g., six of the nine pixels in the higher density render target are of a different color and/or are shaded compared to the one pixel in the original render target). While the example of FIG. 2 scales the original render target by a factor of three, other scaling factors can be used as well (e.g., 1.5, 2, 4, 5, etc.).

Figure 3:
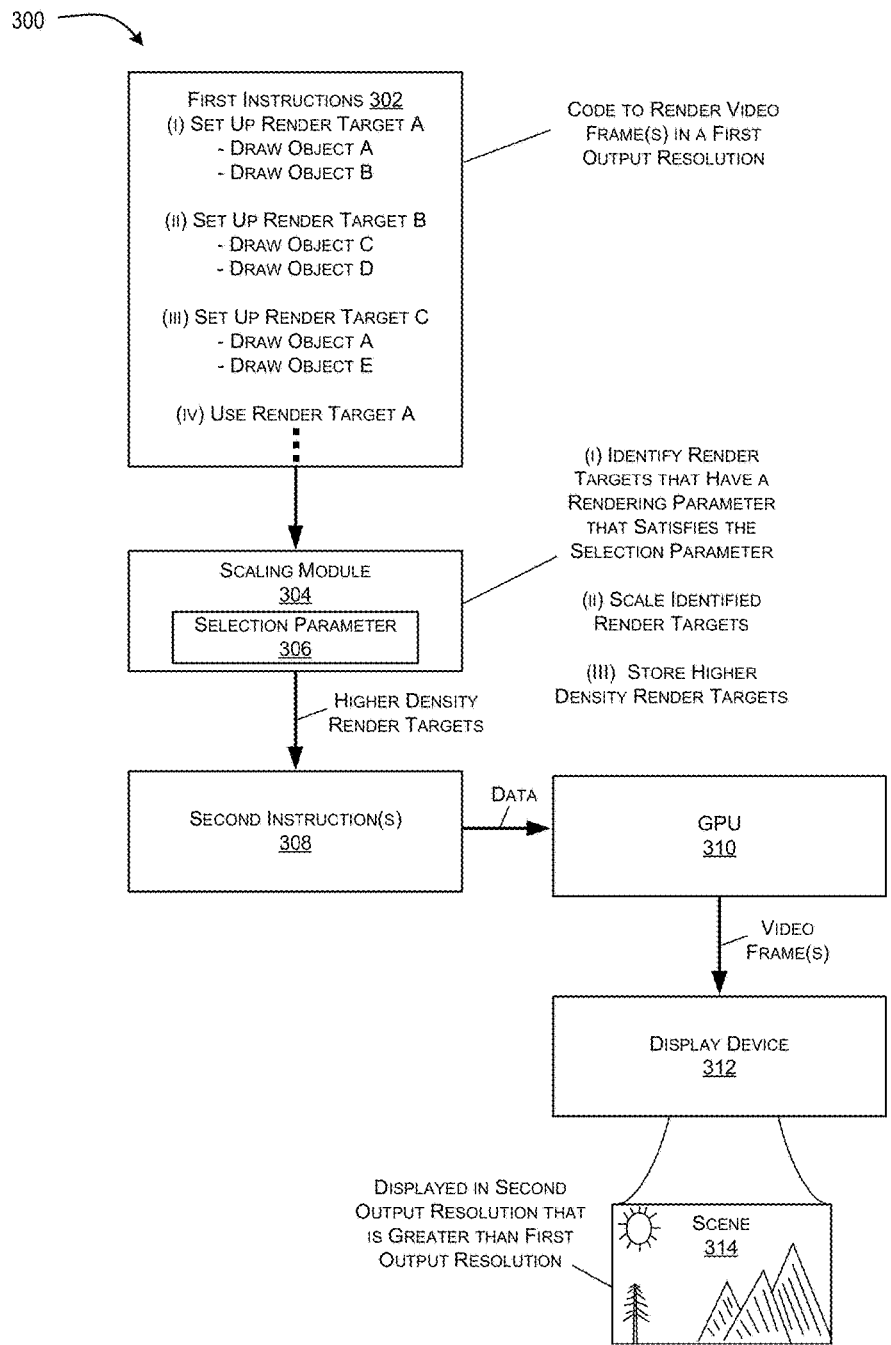
FIG. 3 is a diagram illustrating how instructions written in support of displaying video frames in a first output resolution are received and used to generate higher density render targets that support displaying the video frames in a second output resolution that is greater than the first output resolution.

FIG. 3 is a diagram 300 illustrating how code written in support of displaying video frames in a first output resolution is received and used to generate higher density render targets that support displaying the video frames in a second output resolution that is greater than the first output resolution. As described above, the code is executed, for example, so a user can play a video game. At least some of the code includes first instructions 302 provided to render video frames in the first output resolution. For example, the first instructions 302 can include a command to set up "Render Target A" by drawing "Object A" and drawing "Object B", a command to set up "Render Target B" by drawing "Object C" and drawing "Object D", a command to set up "Render Target C" by drawing "Object A" and drawing "Object E", a command to access "Render Target A" which has already been set up and stored, and so forth.

The first instructions 302 can be part of a command buffer associated with rendering. The first instructions 302 are obtained by a scaling module 304. In various examples, the scaling module 304 can be an application programming interface (API) called upon for rendering purposes. The scaling module 304 creates, stores, and/or has access to a selection parameter 306. As previously described, the selection parameter 306 is used by the scaling module 304 to identify render targets (e.g., Render Target A, Render Target B, and/or Render Target C) that have a rendering parameter that satisfies (e.g., matches) the selection parameter 306. Subsequently, the scaling module 304 scales, based on a scaling factor, an identified render target from a render target resolution that is native to the render target (e.g., a native size) to a higher render target resolution, and stores the corresponding higher density render target in memory so it can be used again.

The higher density render targets then become part of second instructions 308 that are used to render and display video content. The second instructions 308 are a modified version of the first instructions 302, in order to accommodate the scaling. The second instructions 308 can be part of a command buffer associated with rendering. For example, the second instructions 308 may include a different command buffer format and/or different encoding/decoding techniques compared to the first instructions 302. The command buffer includes data (e.g., a program that describes a rendering pipeline) that can be executed by a graphics processing unit (GPU) 310 to produce final video frame(s) to be provided to a display device 312 so they can be displayed as part of a scene 314 in the second output resolution rather than in the first output resolution.

In various examples, the selection parameter 306 used to identify render targets for scaling can define one or more native sizes. For example, the selection parameter 306 can include a whitelist of native sizes that are approved for scaling. The whitelist can contain exact native sizes (e.g., a 1280×720 resolution, a 640×360 resolution, etc.) and/or variable native sizes in which one dimension is defined but the other can vary (e.g., a 1280×* resolution, a *×720 resolution, etc.). In additional or alternative examples, the selection parameter 306 can include a blacklist of native sizes that are prohibited from being scaled. The blacklist can contain exact native sizes and/or variable native sizes, as well.

Figure 4:
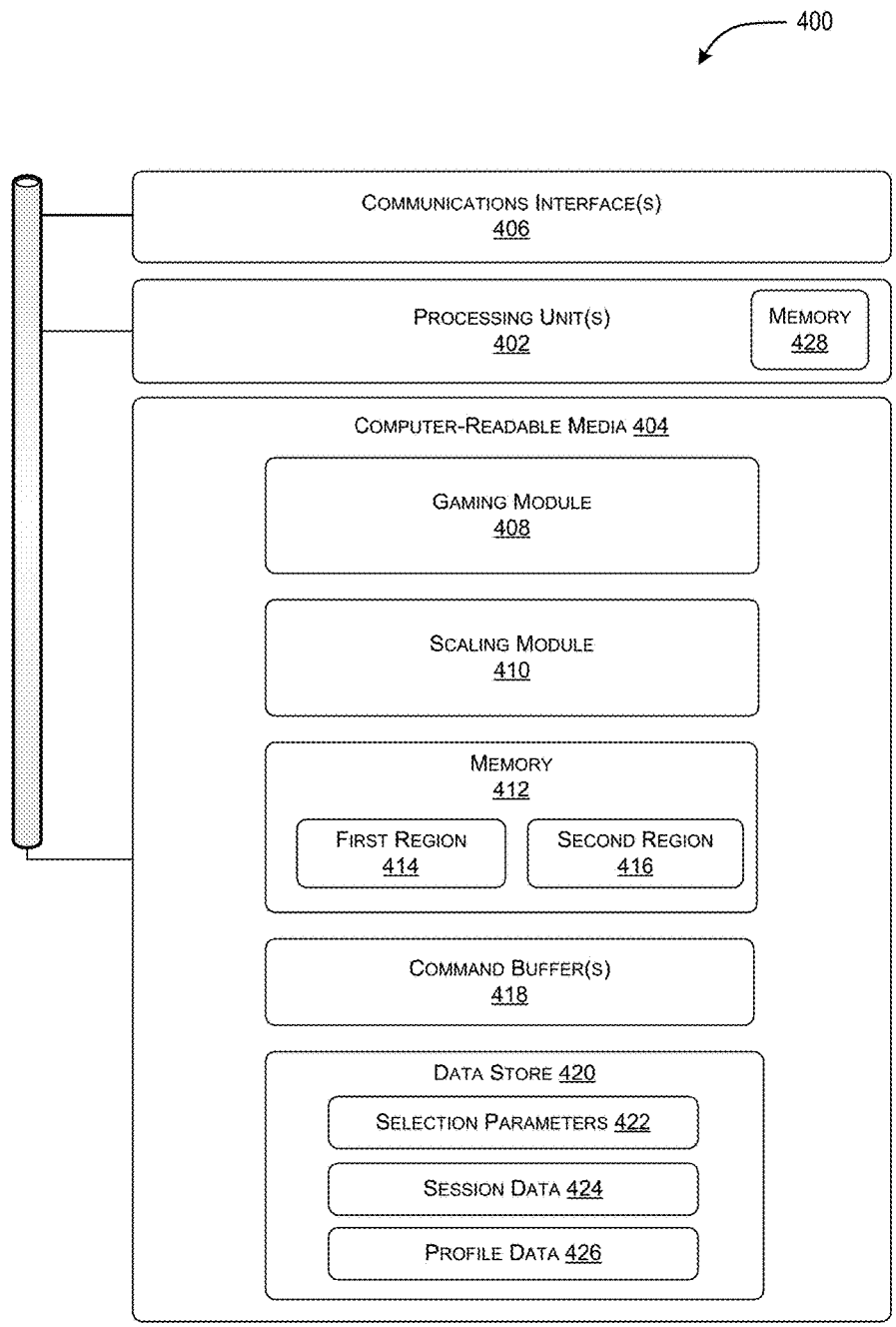
FIG. 4 is a diagram illustrating components of an example system configured to identify render targets to be scaled so that video frames can be displayed in a higher output resolution.

FIG. 4 is a diagram illustrating components of an example system 400 configured to identify render targets to be scaled so that video frames can be displayed in a higher output resolution. In various examples, the system 400 can comprise a client computing device and/or a network device that enables a user to participate, individually or in a team setting, in a gaming session. The gaming session can be hosted, over a network, by a gaming service (e.g., PLAYSTATION NOW, NINTENDO NETWORK, XBOX LIVE, etc.). As an alternative, the gaming session can be hosted by a client computing device without a gaming service (e.g., via peer-to-peer network communications if there is more than one player).

In one example, the system 400 can include a client computing device which includes, but is not limited to: a game console, a desktop computer, a laptop computer, a gaming device, a tablet computer, a personal data assistant (PDA), a mobile phone/tablet hybrid, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorder (PVR), a set-top box, a camera, an integrated component (e.g., a peripheral device) for inclusion in a computing device, an appliance, or any other sort of computing device. In some implementations, a client computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a printer, audio speakers, a haptic output device, and the like).

Additionally or alternatively, the system 400 can include one or more network devices that communicate with a client computing device via one or more network(s). Network(s) can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like. The system 400 can include one or more computing devices that operate in a cluster or other grouped configuration to share resources, balance load, increase performance, provide fail-over support or redundancy, or for other purposes. For instance, computing device(s) can belong to a variety of classes of devices such as server computers, web-server computers, file-server computers, or any other sort of computing device.

The system 400 includes one or more processing unit(s) 402, computer-readable media 404, communication interface(s) 406. In various examples, the components of the system 400 can be operatively connected, for example, via a bus, which can include one or more of a system bus, a data bus, an address bus, a PCI bus, a Mini-PCI bus, and any variety of local, peripheral, and/or independent buses.

As used herein, processing unit(s) 402 can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media 404 can store instructions executable by the processing unit(s) 402. Computer-readable media 404 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media 404 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 406 can represent, for example, network interface controllers (NICs) or other types of transceiver devices to send and receive communications over a network.

In the illustrated example, computer-readable media 404 can include a gaming module 408 and a scaling module 410 (e.g., scaling module 304). The gaming module 408 is configured to execute code of a game title (e.g., the source of the video content) thereby enabling a user to play a game. As described above, the scaling module 410 is configured to receive instructions (e.g., commands) related to rendering video frames and to identify render targets to be scaled so that the video frames can be displayed in a higher output resolution. The computer-readable media 404 further includes memory 412 allocated for a game session being played. The memory 412 can include a first region 414 that is accessible and that is known to the code of the game title, and a second region 416 that is not accessible and that is not known to the code of the game title. The first region 414 of the memory stores the original render targets and render target textures (RTTs), while the second region 416 of memory stores corresponding higher density render targets and higher density RTTs. The different regions of memory are further described herein with respect to FIG. 5.

The computer-readable media 404 further includes command buffer(s) 418 and a data store 420. As previously described, a command buffer 418 contains data to be executed by a GPU in order to display video frames on a display device. The data store 420 can store data for the operations of processes, applications, components, and/or modules stored in computer-readable media 404 and/or executed by processing unit(s) 402 and/or accelerator(s). For instance, in some examples, data store 420 can store selection parameters 422. Moreover, the data store 420 can store session data 424 and/or profile data 426. The session data 424 can comprise a total number of participants in a gaming session, a mode or category of the game title, activity that occurs in the gaming session (e.g., behavior, maneuvers, earned points or a score, and/or achievements of the participants), and/or other data related to when and how the gaming data is executed or hosted. The profile data 426 can include player profile information for the participants in the gaming session.

As an alternative, some or all of the above-referenced data can be stored on separate memories 428 on board one or more processing unit(s) 402 such as a memory on board a CPU-type processor, a GPU-type processor, an FPGA-type accelerator, a DSP-type accelerator, and/or another accelerator.

The number of illustrated modules is just an example, and the number can vary higher or lower. That is, functionality described herein in association with the illustrated modules can be performed by a fewer number of modules or a larger number of modules on one device or spread across multiple devices.

Figure 5:
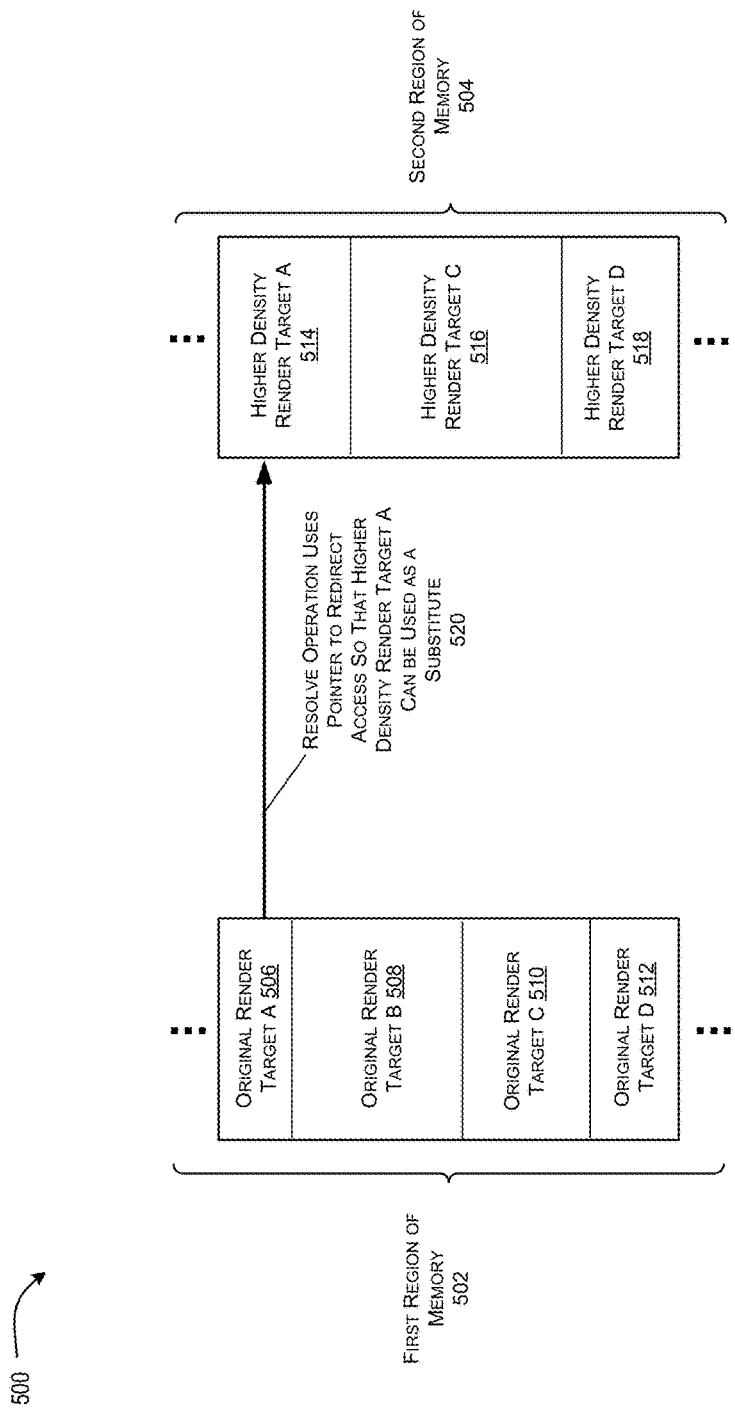
FIG. 5 is a diagram illustrating a resolve operation that redirects an access to an original render target from a first region of memory to a second region of memory that stores a corresponding higher density render target.

FIG. 5 is a diagram 500 illustrating a resolve operation that redirects an access to an original render target or its associated RTT from a first region of memory 502 (e.g., first region 414 in FIG. 4) to a second region of memory 504 (e.g., second region 416 in FIG. 4) that stores a corresponding higher density render target and its associated higher density RTT. The first region of memory 502 is accessible and is known to the code of the game title, and therefore, stores the original render targets generated based on the commands in the code. For example, "Original Render Target A" is stored in a first portion 506 (e.g., segment(s), page(s), block(s), etc.) of the first region of memory 502, "Original Render Target B" is stored in a second portion 508 of the first region of memory 502, "Original Render Target C" is stored in a third portion 510 of the first region of memory 502, "Original Render Target D" is stored in a fourth portion 512 of the first region of memory 502, and so forth.

An original render target identified for scaling has its corresponding higher density render target separately stored in the second region of memory 504, and a pointer (e.g., a mapping) is created to reflect the correspondence. The second region of memory 504 is not accessible and is not known to the code of the game title, and the second region of memory 504 stores the higher density render targets. For example, "Higher Density Render Target A" corresponds to "Original Render Target A" and is stored in a first portion 514 of the second region of memory 504, "Higher Density Render Target C" corresponds to "Original Render Target C" and is stored in a second portion 516 of the second region of memory 504, "Higher Density Render Target D" corresponds to "Original Render Target D" and is stored in a third portion 518 of the second region of memory 504, and so forth. Note that "Original Render Target B" did not have a rendering parameter that satisfied the selection parameter, and thus, a corresponding higher density render target was not generated and stored for "Original Render Target B", thereby conserving processing and storage resources. In various implementations, associated RTTs can also be stored with original or higher density render targets.

When the code of the game title provides a command to access an original render target or its associated RTT, such as "Original Render Target A" stored in the first portion 506 of the first region of memory 502, the system is configured to recognize the pointer to the corresponding "Higher Density Render Target A" stored in the first portion 514 of the second region of memory 504 and subsequently perform a resolve operation so that the higher density render target or its associated higher density RTT can be used as a substitute 520.

Figure 6A:
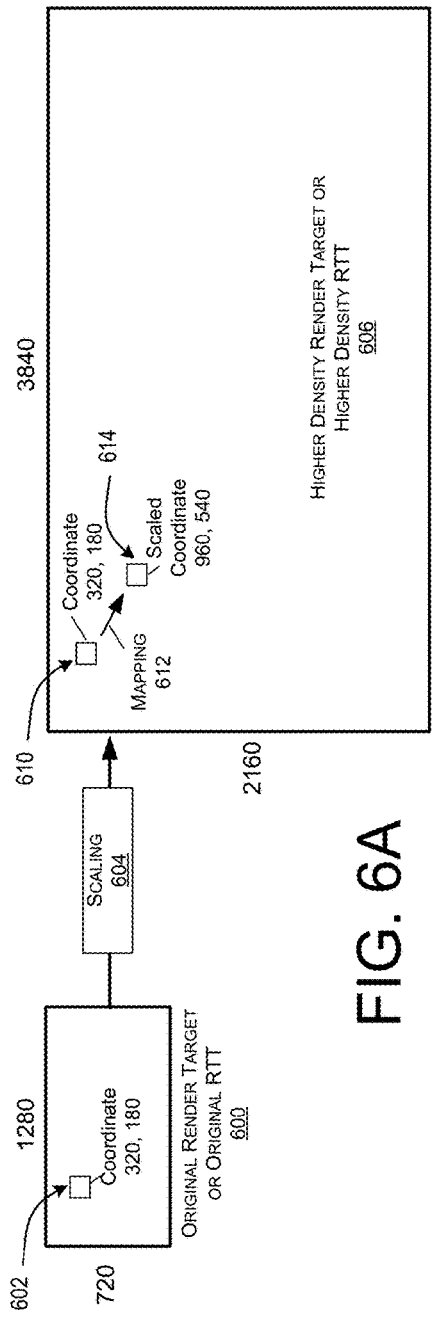
FIGS. 6A and 6B are diagrams that illustrate a scaling adjustment to a coordinate location, implemented in order to maintain correspondence of a pixel across different render targets.
Figure 6B:
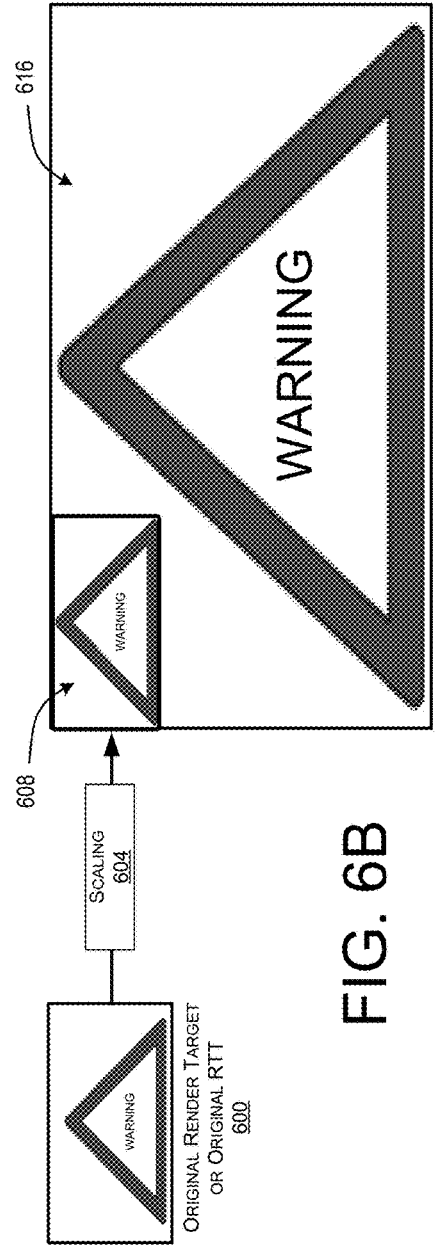

FIGS. 6A and 6B are diagrams that illustrate a scaling adjustment to a coordinate location, implemented in order to maintain correspondence of a pixel across different render targets. FIG. 6A includes an original render target or a corresponding original render target texture (RTT) 600. FIG. 6B illustrates that the original render target or the corresponding original RTT 600 draws a big "WARNING" sign across a display screen (e.g., an overlay notification to a player participating in a video game session). The original render target or the corresponding original RTT 600 may have a native size of 1280×720, as illustrated, and the native size may correspond to an output resolution. Consequently, the original render target or the corresponding original RTT 600 may include information useable to render a pixel 602, at coordinate location (320, 180), in a particular manner so that the "WARNING" sign can be displayed.

However, via the scaling techniques 604 described herein, the native size of the original render target or the corresponding original RTT 600 and the original output resolution may increase to a larger size and/or a higher output resolution, such as 3840×2160, as shown via the higher density render target or a corresponding higher density RTT 606. Consequently, if same coordinate locations from the initially received instructions used to render pixels, such as pixel 602 at coordinate location (320, 180), then the "WARNING" sign will be incorrectly displayed, as shown by 608. To ensure that graphical content is rendered and displayed correctly, a scaling adjustment to a coordinate location is made when a number of pixels increases in accordance with a scaling factor, which is three in the example of FIGS. 6A and 6B. Accordingly, pixel 610 at coordinate location (320, 180) in the higher density render target or a corresponding higher density RTT 606 is mapped 612, in accordance with the scaling factor, to a new pixel 614 at coordinate location (960, 540), so that the information useable to render the pixel 602, at coordinate location (320, 180), in the original render target or the corresponding original RTT 600 is correctly located in the higher density render target or the corresponding higher density RTT 606. Consequently, the "WARNING" sign can be displayed, in the higher output resolution, across the whole display screen as was intended, as shown by 616. The mapping 612 (e.g., scaling adjustment) can be used, for example, to modify a viewport, a scissor rectangle, and/or other screen space constructs including user interface overlays (e.g., a "WARNING" sign).

Figure 7:
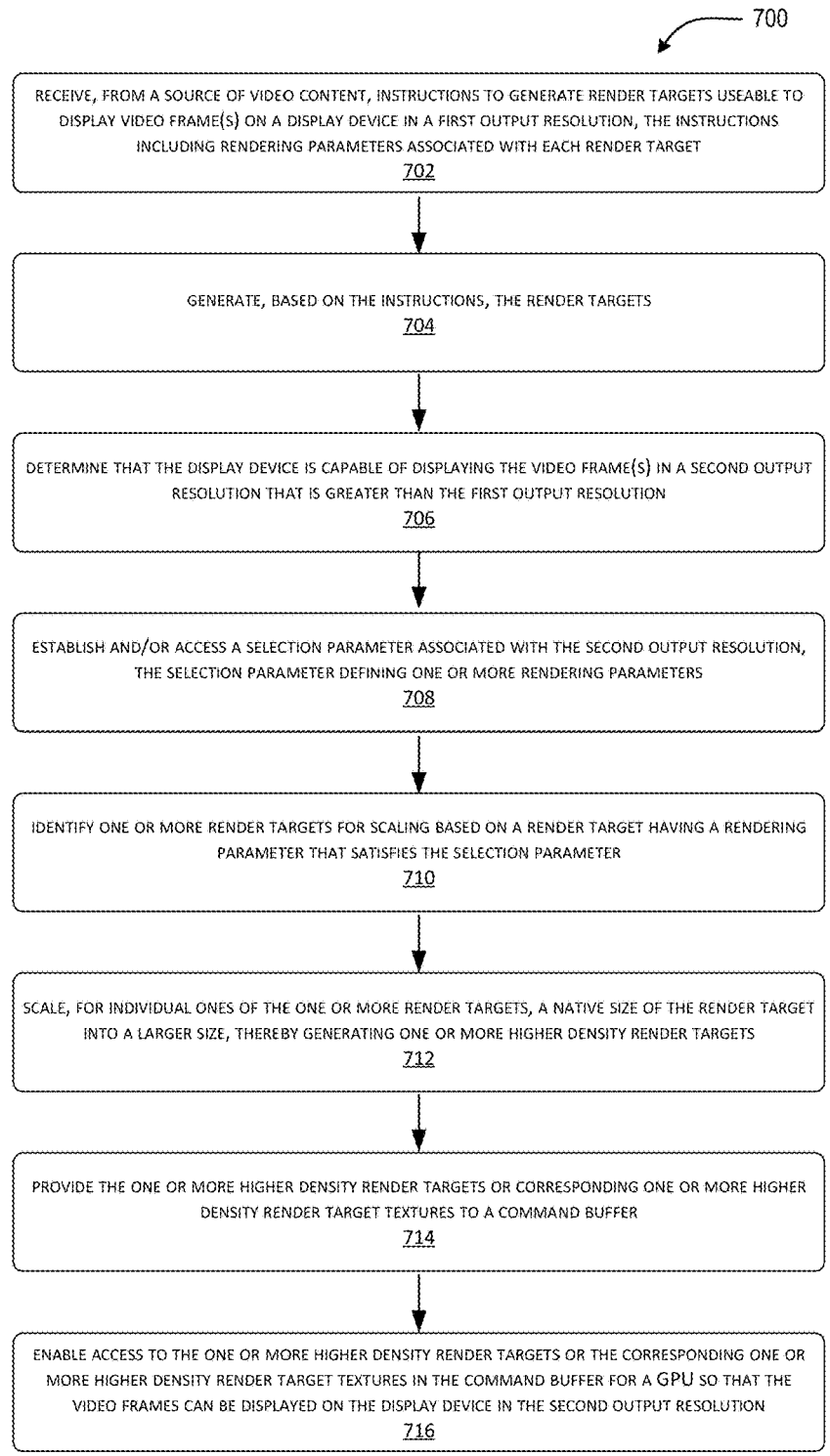
FIG. 7 is a flow diagram of an example method that identifies and scales render targets in a rendering pipeline in order to improve the quality of video frames displayed on a display device.
Figure 8:
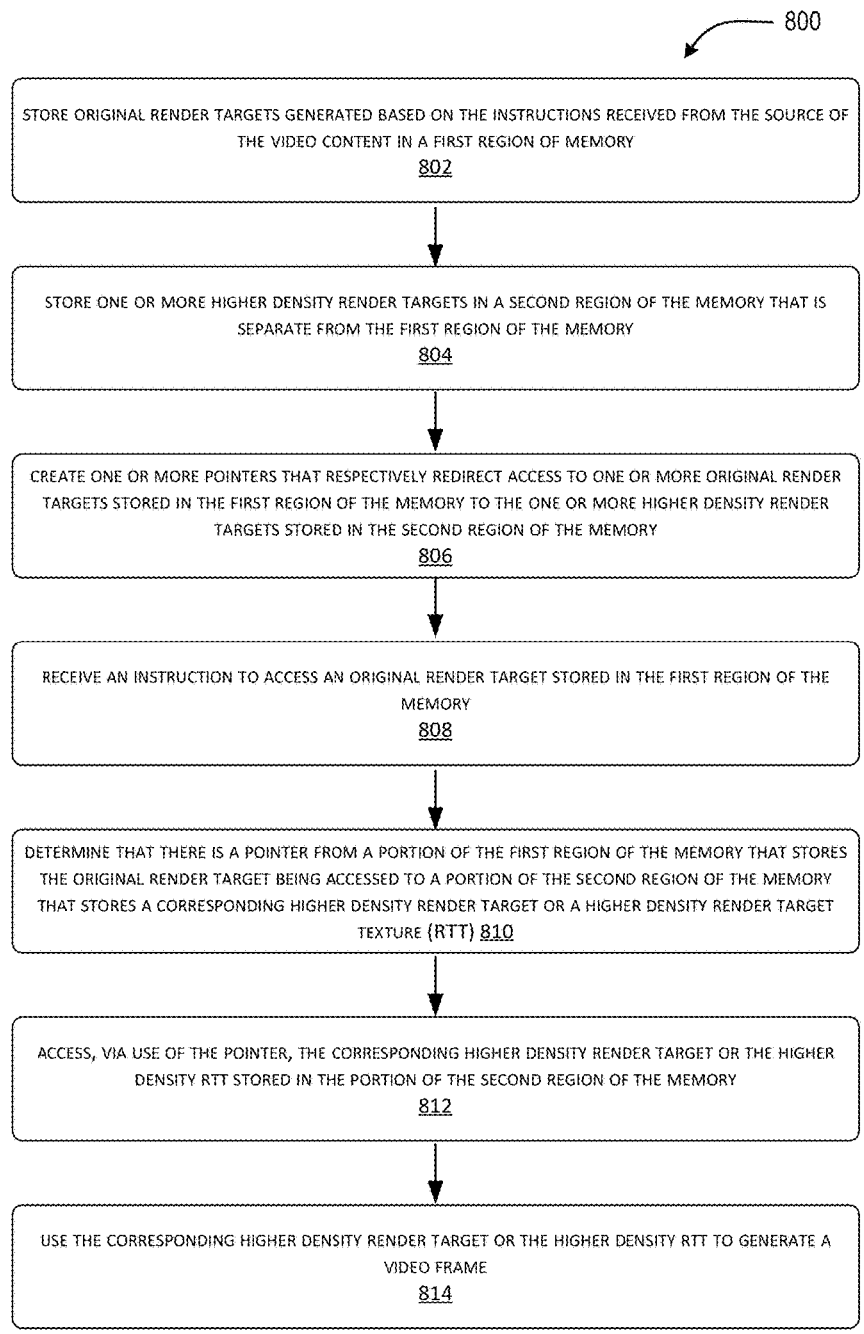
FIG. 8 is a flow diagram of an example method that stores higher density render targets in a separate region of memory so that they can be used as substitutes for the original render targets in order to improve the quality of video frames displayed on a display device.

FIGS. 7 and 8 represent example processes in accordance with various examples from the description of FIGS. 1-6. The example operations shown in FIGS. 7 and 8 can be implemented on or otherwise embodied in one or more of the various systems and/or devices described herein. Components and/or modules described herein can carry out operation(s) of the example processes.

The order in which the operations are described in each example flow diagram is not intended to be construed as a limitation, and any number of the described operations can be combined in any order and/or in parallel to implement each process. Moreover, the operations in each of FIGS. 7 and 8 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations. In the context of hardware, the operations can represent logic functions implemented in circuitry (e.g., datapath-control and finite-state-machine sequencing functions).

FIG. 7 is a flow diagram of an example method 700 that identifies and scales render targets in a rendering pipeline in order to improve the quality of video frames displayed on a display device. In various examples, some or all of the operations of the example method 700 are implemented by a system (e.g., example system 400) such as a client computing device, a network device, or a combination thereof.

At 702, instructions to generate render targets useable to display video frames on a display device in a first output resolution are received from a source of video content. As described above, the instructions include rendering parameters for a render target such as a native size, types of shaders used, and/or graphics settings used.

At 704, the render targets are generated based on the instructions.

At 706, it can be determined that the display device is capable of displaying the video frames in a second output resolution that is greater than the first output resolution.

At 708, a selection parameter associated with the second output resolution is established and/or accessed. The selection parameter defines one or more rendering parameters such as native size(s), types of shaders used, and/or graphics settings used.

At 710, one or more render targets are identified for scaling based on a render target having a rendering parameter that satisfies (e.g., matches) the selection parameter.

At 712, native sizes of the one or more render targets are scaled into a larger size thereby generating one or more higher density render targets.

At 714, the one or more higher density render targets or corresponding one or more higher density render target textures are provided to a command buffer.

At 716, access to the one or more higher density render targets or the corresponding one or more higher density render target textures in the command buffer is enabled for a graphics processing unit so that the video frames can be displayed on the display device in a second output resolution that is greater than the first output resolution.

FIG. 8 is a flow diagram of an example method 800 that stores higher density render targets in a separate region of memory so that they can be used as substitutes for the original render targets in order to improve the quality of video frames displayed on a display device. In various examples, some or all of the operations of the example method 800 are implemented by a system (e.g., example system 400) such as a client computing device, a network device, or a combination thereof. Moreover, the operations of the example method 800 can be implemented in association with the operation of example method 700.

At 802, the original render targets generated based on the instructions received from the source of the video content are stored in a first region of memory.

At 804, one or more higher density render targets are stored in a second region of the memory that is separate from the first region of the memory.

At 806, one or more pointers, that respectively redirect access to one or more original render targets stored in the first region of the memory to the one or more higher density render targets stored in the second region of the memory, are created.

At 808, an instruction to access an original render target stored in the first region of the memory is received.

At 810, it is determined that there is a pointer from a portion of the first region of the memory that stores the original render target being accessed to a portion of the second region of the memory that stores a corresponding higher density render target or a higher density render target texture (RTT).

At 812, via use of the pointer, the corresponding higher density render target or the higher density RTT stored is accessed in the portion of the second region of the memory.

At 814, the corresponding higher density render target or the higher density RTT is used to generate a video frame.

The disclosure presented herein may be considered in view of the following example clauses.

Example Clause A, a system comprising: one or more processing units that include a graphics processing unit; memory to store render targets and render target textures; and a computer-readable medium having encoded thereon computer-executable instructions to cause the system to: receive, from a source of video content, instructions to generate a plurality of render targets useable to display at least one video frame on a display device in a first output resolution, the instructions including rendering parameters associated with each render target of the plurality of render targets, wherein a rendering parameter for each render target includes a native size of the render target; generate, based at least in part on the instructions, the plurality of render targets; store the plurality of render targets in a first region of the memory; determine that the display device is capable of displaying the at least one video frame in a second output resolution that is greater than the first output resolution; access a selection parameter associated with the second output resolution, the selection parameter useable to identify one or more render targets, of the plurality of render targets, for scaling, wherein the selection parameter defines one or more native sizes; identify, using the selection parameter, the one or more render targets for scaling, wherein an individual render target of the one or more render targets is identified for scaling based at least in part on a match between a native size of the individual render target and a native size of the one or more native sizes defined by the selection parameter; scale, for individual ones of the one or more render targets, the native size of the render target into a larger size, thereby generating one or more higher density render targets; store the one or more higher density render targets in a second region of the memory that is separate from the first region of the memory; create one or more pointers that respectively redirect access to the one or more render targets stored in the first region of the memory to the one or more higher density render targets stored in the second region of the memory; provide the one or more higher density render targets or corresponding one or more higher density render target textures to a command buffer; and access, by the graphics processing unit, the one or more higher density render targets or the corresponding one or more higher density render target textures in the command buffer to cause the at least one video frame to be displayed on the display device in the second output resolution.

Example Clause B, the system of Example Clause A, wherein the instructions to generate the plurality of render targets do not natively support displaying the at least one video frame in the second output resolution.

Example Clause C, the system of Example Clause A or Example Clause B, wherein the first resolution comprises 1280×720 and the second resolution comprises 3840×2160.

Example Clause D, the system of any one of Example Clause A through Example Clause C, wherein the computer-executable instructions further cause the system to: receive an instruction to access a render target stored in the first region of the memory; determine that there is a pointer from a portion of the first region of the memory that stores the render target to a portion of the second region of the memory that stores a corresponding higher density render target; access, via use of the pointer, the corresponding higher density render target stored in the portion of the second region of the memory; and use the corresponding higher density render target to generate another video frame.

Example Clause E, the system of any one of Example Clause A through Example Clause D, wherein the computer-executable instructions further cause the system to: create a mapping of a coordinate location of a pixel in a render target to a new coordinate location of a corresponding pixel in a corresponding higher density render target; and store the mapping in association with the corresponding higher density render target.

Example Clause F, the system of Example Clause E, wherein the computer-executable instructions further cause the system to use the mapping to modify a viewport, a scissor rectangle, a user interface overlay, or a screen space construct.

While Example Clauses A through F are described above with respect to a system, it is understood that the subject matter recited in Example Clauses A through F can additionally or alternatively be implemented as a method, by a device, and/or via computer-readable storage media.

Example Clause G, a method comprising: receiving, from a source of video content, instructions to generate a plurality of render targets useable to display at least one video frame on a display device in a first output resolution, the instructions including rendering parameters associated with each render target of the plurality of render targets; generating, based at least in part on the instructions, the plurality of render targets; identifying, using a selection parameter, one or more render targets for scaling, wherein an individual render target of the one or more render targets is identified for scaling based at least in part on a rendering parameter satisfying the selection parameter; scaling, for individual ones of the one or more render targets, a native size of the render target into a larger size, thereby generating one or more higher density render targets; providing the one or more higher density render targets or corresponding one or more higher density render target textures to a command buffer; and enabling access, by a graphics processing unit, to the one or more higher density render targets or the corresponding one or more higher density render target textures in the command buffer to cause the at least one video frame to be displayed on the display device in a second output resolution that is greater than the first output resolution.

Example Clause H, the method of Example Clause G, wherein the rendering parameter and the selection parameter include a type of shader, and the individual render target of the one or more render targets is identified for scaling based at least in part on the type of shader used in the individual render target matching the type of shader defined by the selection parameter.

Example Clause I, the method of Example Clause G, wherein the rendering parameter and the selection parameter include a graphics setting, and the individual render target of the one or more render targets is identified for scaling based at least in part on the graphics setting used in the individual render target matching the graphics setting defined by the selection parameter.

Example Clause J, the method of Example Clause G, wherein the selection parameter include a native size, and the individual render target of the one or more render targets is identified for scaling based at least in part on the native size of the individual render target matching the native size defined by the selection parameter.

Example Clause K, the method of any one of Example Clause G through Example Clause J, further comprising: storing the one or more render targets in a first region of memory that is accessible to the source of the video content; storing the one or more higher density render targets in a second region of the memory that is separate from the first region of the memory and that is inaccessible to the source of the video content; and creating one or more pointers that respectively redirect access to the one or more render targets stored in the first region of the memory to the one or more higher density render targets stored in the second region of the memory.

Example Clause L, the method of any one of Example Clause G through Example Clause K, wherein the instructions to generate the plurality of render targets do not natively support displaying the at least one video frame in the second output resolution.

Example Clause M, the method of any one of Example Clause G through Example Clause L, wherein the scaling is performed based at least in part on a predetermined scaling factor that increases a pixel count.

While Example Clauses G through M are described above with respect to a method, it is understood that the subject matter recited in Example Clauses G through M can additionally or alternatively be implemented by a system, by a device, and/or via computer-readable storage media.

Example Clause N, a system comprising: one or more processing units that include a graphics processing unit; and a computer-readable medium having encoded thereon computer-executable instructions to cause the system to: receive, from a source of video content, commands to generate a plurality of render targets useable to display at least one video frame on a display device in a first output resolution, the instructions including rendering parameters associated with each render target of the plurality of render targets; generate, based at least in part on the commands, the plurality of render targets; identify, using a selection parameter, one or more render targets for scaling, wherein an individual render target of the one or more render targets is identified for scaling based at least in part on a rendering parameter satisfying the selection parameter; scale, for individual ones of the one or more render targets, a native size of the render target into a larger size, thereby generating one or more higher density render targets; provide the one or more higher density render targets or corresponding one or more higher density render target textures to a command buffer; and enable access, by a graphics processing unit, to the one or more higher density render targets or the corresponding one or more higher density render target textures in the command buffer to cause the at least one video frame to be displayed on the display device in a second output resolution that is greater than the first output resolution.

Example Clause O, the system of Example Clause N, wherein the rendering parameter and the selection parameter include a type of shader, and the individual render target of the one or more render targets is identified for scaling based at least in part on the type of shader used in the individual render target matching the type of shader defined by the selection parameter.

Example Clause P, the system of Example Clause N, wherein the rendering parameter and the selection parameter include a graphics setting, and the individual render target of the one or more render targets is identified for scaling based at least in part on the graphics setting used in the individual render target matching the graphics setting defined by the selection parameter.

Example Clause Q, the system of Example Clause N, wherein the selection parameter include a native size, and the individual render target of the one or more render targets is identified for scaling based at least in part on the native size of the individual render target matching the native size defined by the selection parameter.

Example Clause R, the system of any one of Example Clause N through Example Clause Q, wherein the commands to generate the plurality of render targets do not natively support displaying the at least one video frame in the second output resolution.

Example Clause S, the system of any one of Example Clause N through Example Clause R, wherein the computer-executable instructions further cause the system to: create a mapping of a coordinate location of a pixel in a render target to a new coordinate location of a corresponding pixel in a corresponding higher density render target; and store the mapping in association with the corresponding higher density render target.

Example Clause T, the system of Example Clause S, wherein the computer-executable instructions further cause the system to use the mapping to modify a viewport, a scissor rectangle, a user interface overlay, or a screen space construct.

While Example Clauses N through T are described above with respect to a system, it is understood that the subject matter recited in Example Clauses N through T can additionally or alternatively be implemented as a method, by a device, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units that include a graphics processing unit;
   memory to store render targets and render target textures; and
   a computer-readable medium having encoded thereon computer-executable instructions to cause the system to:
   receive, from a source of video content, instructions to generate a plurality of render targets useable to display at least one video frame on a display device in a first output resolution, the instructions including rendering parameters associated with each render target of the plurality of render targets, wherein a rendering parameter for each render target includes a native size of the render target;
   generate, based at least in part on the instructions, the plurality of render targets;
   store the plurality of render targets in a first region of the memory;
   determine that the display device is capable of displaying the at least one video frame in a second output resolution that is greater than the first output resolution;
   access a selection parameter associated with the second output resolution, the selection parameter useable to identify one or more render targets, of the plurality of render targets, for scaling, wherein the selection parameter defines one or more native sizes;
   identify, using the selection parameter, the one or more render targets for scaling, wherein an individual render target of the one or more render targets is identified for scaling based at least in part on a match between a native size of the individual render target and a native size of the one or more native sizes defined by the selection parameter;
   scale, for individual ones of the one or more render targets, the native size of the render target into a larger size, thereby generating one or more higher density render targets;
   store the one or more higher density render targets in a second region of the memory that is separate from the first region of the memory;
   create one or more pointers that respectively redirect access to the one or more render targets stored in the first region of the memory to the one or more higher density render targets stored in the second region of the memory;
   provide the one or more higher density render targets or corresponding one or more higher density render target textures to a command buffer; and
   access, by the graphics processing unit, the one or more higher density render targets or the corresponding one or more higher density render target textures in the command buffer to cause the at least one video frame to be displayed on the display device in the second output resolution.

2. The system of claim 1, wherein the instructions to generate the plurality of render targets do not natively support displaying the at least one video frame in the second output resolution.

3. The system of claim 1, wherein the first resolution comprises 1280×720 and the second resolution comprises 3840×2160.

4. The system of claim 1, wherein the computer-executable instructions further cause the system to:
receive an instruction to access a render target stored in the first region of the memory;
determine that there is a pointer from a portion of the first region of the memory that stores the render target to a portion of the second region of the memory that stores a corresponding higher density render target;
access, via use of the pointer, the corresponding higher density render target stored in the portion of the second region of the memory; and
use the corresponding higher density render target to generate another video frame.

5. The system of claim 1, wherein the computer-executable instructions further cause the system to:
create a mapping of a coordinate location of a pixel in a render target to a new coordinate location of a corresponding pixel in a corresponding higher density render target; and
store the mapping in association with the corresponding higher density render target.

6. The system of claim 5, wherein the computer-executable instructions further cause the system to use the mapping to modify a viewport, a scissor rectangle, a user interface overlay, or a screen space construct.

7. A method comprising:
receiving, from a source of video content, instructions to generate a plurality of render targets useable to display at least one video frame on a display device in a first output resolution, the instructions including rendering parameters associated with each render target of the plurality of render targets;
generating, based at least in part on the instructions, the plurality of render targets;
identifying, using a selection parameter, one or more render targets for scaling, wherein an individual render target of the one or more render targets is identified for scaling based at least in part on a rendering parameter satisfying the selection parameter;
scaling, for individual ones of the one or more render targets, a native size of the render target into a larger size, thereby generating one or more higher density render targets;
providing the one or more higher density render targets or corresponding one or more higher density render target textures to a command buffer; and
enabling access, by a graphics processing unit, to the one or more higher density render targets or the corresponding one or more higher density render target textures in the command buffer to cause the at least one video frame to be displayed on the display device in a second output resolution that is greater than the first output resolution.

8. The method of claim 7, wherein the rendering parameter and the selection parameter include a type of shader, and the individual render target of the one or more render targets is identified for scaling based at least in part on the type of shader used in the individual render target matching the type of shader defined by the selection parameter.

9. The method of claim 7, wherein the rendering parameter and the selection parameter include a graphics setting, and the individual render target of the one or more render targets is identified for scaling based at least in part on the graphics setting used in the individual render target matching the graphics setting defined by the selection parameter.

10. The method of claim 7, wherein the selection parameter include a native size, and the individual render target of the one or more render targets is identified for scaling based at least in part on the native size of the individual render target matching the native size defined by the selection parameter.

11. The method of claim 7, further comprising:
storing the one or more render targets in a first region of memory that is accessible to the source of the video content;
storing the one or more higher density render targets in a second region of the memory that is separate from the first region of the memory and that is inaccessible to the source of the video content; and
creating one or more pointers that respectively redirect access to the one or more render targets stored in the first region of the memory to the one or more higher density render targets stored in the second region of the memory.

12. The method of claim 7, wherein the instructions to generate the plurality of render targets do not natively support displaying the at least one video frame in the second output resolution.

13. The method of claim 7, wherein the scaling is performed based at least in part on a predetermined scaling factor that increases a pixel count.

14. A system comprising:
one or more processing units that include a graphics processing unit; and
a computer-readable medium having encoded thereon computer-executable instructions to cause the system to:
receive, from a source of video content, commands to generate a plurality of render targets useable to display at least one video frame on a display device in a first output resolution, the instructions including rendering parameters associated with each render target of the plurality of render targets;
generate, based at least in part on the commands, the plurality of render targets;
identify, using a selection parameter, one or more render targets for scaling, wherein an individual render target of the one or more render targets is identified for scaling based at least in part on a rendering parameter satisfying the selection parameter;
scale, for individual ones of the one or more render targets, a native size of the render target into a larger size, thereby generating one or more higher density render targets;
provide the one or more higher density render targets or corresponding one or more higher density render target textures to a command buffer; and
enable access, by a graphics processing unit, to the one or more higher density render targets or the corresponding one or more higher density render target textures in the command buffer to cause the at least one video frame to be displayed on the display device in a second output resolution that is greater than the first output resolution.

15. The system of claim 14, wherein the rendering parameter and the selection parameter include a type of shader, and the individual render target of the one or more render targets is identified for scaling based at least in part on the type of shader used in the individual render target matching the type of shader defined by the selection parameter.

16. The system of claim 14, wherein the rendering parameter and the selection parameter include a graphics setting, and the individual render target of the one or more render targets is identified for scaling based at least in part on the graphics setting used in the individual render target matching the graphics setting defined by the selection parameter.

17. The system of claim 14, wherein the selection parameter include a native size, and the individual render target of the one or more render targets is identified for scaling based at least in part on the native size of the individual render target matching the native size defined by the selection parameter.

18. The system of claim 14, wherein the commands to generate the plurality of render targets do not natively support displaying the at least one video frame in the second output resolution.

19. The system of claim 14, wherein the computer-executable instructions further cause the system to:
   create a mapping of a coordinate location of a pixel in a render target to a new coordinate location of a corresponding pixel in a corresponding higher density render target; and
   store the mapping in association with the corresponding higher density render target.

20. The system of claim 19, wherein the computer-executable instructions further cause the system to use the mapping to modify a viewport, a scissor rectangle, a user interface overlay, or a screen space construct.

* * * * *